United States Patent
Yao et al.

(10) Patent No.: US 9,628,368 B2
(45) Date of Patent: Apr. 18, 2017

(54) METHOD AND APPARATUS FOR COMPRESSING CONTENT NAME

(71) Applicant: Huawei Technologies Co., Ltd., Shenzhen (CN)

(72) Inventors: Chunfeng Yao, Shenzhen (CN); Rong Wang, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/005,717

(22) Filed: Jan. 25, 2016

(65) Prior Publication Data

US 2016/0142281 A1 May 19, 2016

Related U.S. Application Data

(63) Continuation of application No. PCT/CN2014/081386, filed on Jul. 1, 2014.

(30) Foreign Application Priority Data

Jul. 26, 2013 (CN) .......................... 2013 1 0320132

(51) Int. Cl.
*H04L 12/28* (2006.01)
*H04L 12/751* (2013.01)
(Continued)

(52) U.S. Cl.
CPC ........ *H04L 45/02* (2013.01); *G06F 17/30327* (2013.01); *G06F 17/30961* (2013.01); *H04L 67/327* (2013.01)

(58) Field of Classification Search
None
See application file for complete search history.

(56) References Cited

U.S. PATENT DOCUMENTS 6,859,455 B1* 2/2005 Yazdani ............ G06F 17/30985
370/392
7,903,666 B1* 3/2011 Kumar .................... H04L 45/02
370/395.31

(Continued)

FOREIGN PATENT DOCUMENTS

| CN | 102882987 A | 1/2013 |
| CN | 103095724 A | 5/2013 |
| CN | 103179037 A | 6/2013 |

OTHER PUBLICATIONS

Liu et al., "A Multi-Level DHT Routing Framework with Aggregation," Proceedings of the second edition of the ICN workshop on Information-centric networking, Helsinki, Finland, pp. 43-48, Association for Computing Machinery, New York, New York (Aug. 17, 2012).

(Continued)

*Primary Examiner* — Edan Orgad
*Assistant Examiner* — Rebecca Song
(74) *Attorney, Agent, or Firm* — Leydig, Voit & Mayer, Ltd.

(57) ABSTRACT

A method and an apparatus for compressing a content name are provided. In the method, a controller constructs a content name tree according to content names in a content database, where a first node of the content name tree stores a first-level prefix of a content name in the content database, and an $N^{th}$-level node of the content name tree stores prefixes of first N levels of the content name; and then the controller compresses a content name stored in the $M^{th}$-level node into a first content name stored in a father node of the $M^{th}$-level node when determining that the content name stored in each $M^{th}$-level node in the content name tree is corresponding to a first network node in a network. Thus, compression of a (Continued)

content name in a content name database is achieved, and space occupied by the content name is saved.

18 Claims, 3 Drawing Sheets

(51) Int. Cl.
*G06F 17/30* (2006.01)
*H04L 29/08* (2006.01)

(56) References Cited

U.S. PATENT DOCUMENTS

2009/0063538 A1    3/2009  Chitrapura et al.
2011/0072113 A1*   3/2011  Goto .................. H04L 65/1026
                                                                709/218

OTHER PUBLICATIONS

Narayanan et al., "NDN and IP Routing Can It Scale?," PowerPoint, Cisco Systems, Inc., San Jose, California (Feb. 23, 2015).
Li et al., "On the Scalability of Router Forwarding Tables: Nexthop-Selectable FIB Aggregation," 2011 Proceedings IEEE INFOCOM, Shanghai, China, pp. 321-325, Institute of Electrical and Electronics Engineers, New York, New York (Apr. 10-15, 2011).
Jacobson et al., "Networking Named Content," CoNEXT '09 Proceedings of the 5$^{th}$ International Conference on Emerging Networking Experiments and Technologies, pp. 1-12, Association for Computing Machinery, New York, New York (Dec. 1-4, 2009).

* cited by examiner

METHOD AND APPARATUS FOR COMPRESSING CONTENT NAME

CROSS-REFERENCE TO RELATED APPLICATIONS

This application is a continuation of International Patent Application No. PCT/CN2014/081386, filed on Jul. 1, 2014, which claims priority to Chinese Patent Application No. 201310320132.8, filed on Jul. 26, 2013, both of which are hereby incorporated by reference in their entireties.

TECHNICAL FIELD

The present invention relates to network technologies and, in particular, to a method and an apparatus for compressing a content name.

BACKGROUND

With development of Internet, people are discussing a network centered on information content, that is, an information centric networking (Information centric networking, ICN for short hereafter), and a specific network architecture may be a named data network (Named Data Network, NDN for short hereafter) or a content centric networking (Content Centric Networking, CCN for short hereafter), etc.

In the above network architectures, when a data packet sent from a network node needs to go through at least one router to reach another network node, routing information may be obtained by matching with the router on a data packet transmission path, that is, a content name in a forwarding table (Forwarding Information Base, FIB) configured in the router. In the NDN, a domain name is generally used as the content name in the FIB.

However, in the prior art, a domain name may include a top level domain name, a second level domain name and a third level domain name, where there are $2 \times 10^8$ top level domain names, and if not only a top level domain name is included in the content name of the FIB, but also a second level domain name and a third level domain name are included therein, then a problem that the content name occupies large space will occur.

SUMMARY

The present invention provides a method and an apparatus for compressing a content name, which are used to solve the problem that the content name occupies large space.

In a first aspect of the present invention, a method for compressing a content name is provided, including:

constructing, by a controller, a content name tree according to content names in a content database, where the content name tree is tree-structured, a first-level node of the content name tree stores a first-level prefix of a content name, an $N^{th}$-level node of the content name tree stores prefixes of at least first N levels of the content name, and N is an integer greater than 1; and when determining, by the controller, that a first content name stored in each $M^{th}$-level node in the content name tree is corresponding to a first network node, compressing the first content name stored in the $M^{th}$-level node into a second content name stored in a father node of the $M^{th}$-level node, where each $M^{th}$-level node is connected to a same father node, the first network node includes at least one content router, M is an integer greater than 1, and M is less than or equal to N.

In a first possible implementation of the first aspect, before the constructing, by the controller, the content name tree according to the content names in the content database, further including:

constructing, by the controller, a network topology tree according to a topology information table, where the network topology tree is tree-structured, a first content router is configured on a first-layer node of the network topology tree, an $N^{th}$ content router directly and physically connected to an $M^{th}$ content router is set at an $N^{th}$-layer node of the network topology tree, M+1=N, N is an integer greater than 1, the topology information table is stored in the controller, and a topology structure between content routers is stored in the topology information table;

before the compressing the first content name stored in the $M^{th}$-level node into the second content name stored in the father node of the $M^{th}$-level node, further including:

determining, by the controller, a content router other than the first content router on a subtree in the network topology tree as the first network node, where the first network node is connected to the first content router via a first port of the first content router.

With reference to the first possible implementation of the first aspect, in a second possible implementation of the first aspect, before the constructing, by the controller, the content name tree according to the content names in the content database, or after the constructing, by the controller, the content name tree according to the content names in the content database, further including:

receiving, by the controller, a route request message sent by the second content router, where the route request message is used to request, from the controller, a route from the second content router to a content router storing the first content name, and the route request message carries the first content name.

With reference to the second possible implementation of the first aspect, in a third possible implementation of the first aspect, after the receiving, by the controller, the route request message sent by the second content router, further including:

sending, by the controller, a route response message to the second content router and all content routers located on the route from the second content router to the content router storing the first content name, where the route response message carries the second content name and the route from the second content router to the content router storing the first content name, and the second content name is a content name obtained by compressing the first content name.

With reference to the first possible implementation of the first aspect, in a fourth possible implementation of the first aspect, after the compressing the first content name stored in the $M^{th}$-level node into the second content name stored in the father node of the $M^{th}$-level node, further including:

constructing, by the controller, a first forwarding table FIB according to the first network node and the second content name, where the first FIB carries the second content name and the first port, and the first port is a port through which the first content router reaches the first network node.

With reference to the fourth possible implementation of the first aspect, in a fifth possible implementation of the first aspect, after the constructing, by the controller, the first forwarding table FIB according to the first network node and the second content name, further including:

sending, by the controller, the first FIB to the first content router.

With reference to the fourth possible implementation of the first aspect, in a sixth possible implementation of the first aspect, after the constructing, by the controller, the first forwarding table FIB according to the first network node and the second content name, further including:

receiving, by the controller, an FIB request message sent by the first content router where the FIB request message is used to request the first FIB; and sending, by the controller, an FIB response message to the first content router, where the FIB response message carries the first FIB.

With reference to the first aspect to any one of the sixth possible implementations of the first aspect, in a seventh possible implementation of the first aspect, after the compressing the first content name stored in the $M^{th}$-level node into the second content name stored in the father node of the $M^{th}$-level node, further including:

receiving, by the controller, content information sent by a third content router, and storing a new content name carried in the content information into the content name tree, where a first-level node of the content name tree stores a first-level prefix of the new content name, an $N^{th}$-level node of the content name tree stores prefixes of at least first N levels of the new content name, and the content information carries the new content name and a content router identification storing the new content name;

determining, by the controller, whether the new content name stored in a $K^{th}$-level node and the second content name stored in a further $K^{th}$-level node are respectively stored in different network nodes, where the further $K^{th}$-level node and the $K^{th}$-level node storing the new content name have a same father node, the new content name is stored in a second network node, the second network node is a content router, the first content name is stored in the first network node, and K is less than or equal to N;

if so, then updating, by the controller, routing information on a third network node connected to both the first network node and the second network node, where the third network node includes at least one content router.

With reference to the seventh possible implementation of the first aspect, in an eighth possible implementation of the first aspect, the updating, by the controller, the routing information on the third network node connected to both the first network node and the second network node includes:

sending, by the controller, the new content name and a second port to the third network node, where the second port is a port through which the third network node reaches the second network node.

In a second aspect of the present invention, an apparatus for compressing a content name is provided, including:

a constructing module, configured to construct a content name tree according to content names in a content database, where the content name tree is tree-structured, a first-level node of the content name tree stores a first-level prefix of a content name, an $N^{th}$-level node of the content name tree stores prefixes of at least first N levels of the content name, and N is an integer greater than 1; and a compressing module, configured to, when determining that a first content name stored in each $M^{th}$-level node in the content name tree is corresponding to a first network node, compress the first content name stored in the $M^{th}$-level node into a second content name stored in a father node of the $M^{th}$-level node, where each $M^{th}$-level node is connected to a same father node, the first network node includes at least one content router, M is an integer greater than or equal to 1, and M is less than or equal to N.

In a first possible implementation of the second aspect, further including: a determining module;

the constructing module is further configured to construct a network topology tree according to a topology information table, where the network topology tree is tree-structured, a first content router is set at a first-layer node of the network topology tree, an $N^{th}$ content router directly and physically connected to an $M^{th}$ content router is set at an $N^{th}$-layer node of the network topology tree, M+1=N, N is an integer greater than 1, the topology information table is stored in a controller, and a topology structure between content routers is stored in the topology information table;

the determining module is configured to determine a content router other than the first content router on a child tree in the network topology tree as the first network node, where the first network node is connected to the first content router via a first port of the first content router.

With reference to the first possible implementation of the second aspect, in a second possible implementation of the second aspect, further including: a receiving module, configured to receive a route request message sent by the second content router, where the route request message is configured to request, from the controller, a route from the second content router to a content router storing the first content name, and the route request message carries the first content name.

With reference to the second possible implementation of the second aspect, in a third possible implementation of the second aspect, further including: a sending module, configured to send a route response message to the second content router and all content router located on the route between the second content router and the content router storing the first content name, where the route response message carries the second content name and the route from the second content router to the content router storing the first content name, and the second content name is a content name obtained by compressing the first content name.

With reference to the first possible implementation of the second aspect, in a fourth possible implementation of the second aspect, the constructing module is further configured to construct a first forwarding table FIB according to the first network node and the second content name, where the first FIB carries the second content name and the first port, and the first port is a port through which the first content router reaches the first network node.

With reference to the fourth possible implementation of the second aspect, in a fifth possible implementation of the second aspect, the sending module is further configured to send the first FIB to the first content router.

With reference to the fourth possible implementation of the second aspect, in a sixth possible implementation of the second aspect, the receiving module is further configured to receive an FIB request message sent by the first content router, where the FIB request message is used to request the first FIB; and the sending module is further configured to send an FIB response message to the first content router, where the FIB response message carries the first FIB.

With reference to the second aspect to any one of the six possible implementations of the second aspect, in a seventh possible implementation of the second aspect, the receiving module is further configured to receive content information sent by a third content router, and store a new content name carried in the content information into the content name tree, where a first-level node of the content name tree stores a first-level prefix of the new content name, an $N^{th}$-level node of the content name tree stores prefixes of at least first N levels of the new content name, and the content information carries the new content name and a content router identification storing the new content name;

the determining module is further configured to determine whether the new content name stored in a $K^{th}$-level node and the second content name stored in a further $K^{th}$-level node are respectively stored in different network nodes, where the further $K^{th}$-level node and the $K^{th}$-level node storing the new content name have a same father node, the new content name is stored in a second network node, the second network node is a content router, the first content name is stored in the first network node; if so, then the controller updates routing information on a third network node connected to both the first network node and the second network node, where the third network node includes at least one content router.

With reference to the seventh possible implementation of the second aspect, in an eighth possible implementation of the second aspect, the sending module is specifically configured to send the new content name and a second port to the third network node, where the second port is a port through which the third network node reaches the second network node.

According to the method for compressing a content name provided in embodiments of the present invention, a controller constructs a content name tree according to content names in a content database, where a first-level node of the content name tree stores a first-level prefix of a content name in the content database, and an $N^{th}$-level node of the content name tree is stored with prefixes of first N levels of the content name; and then the controller compresses a first content name stored in the $M^{th}$-level node into a second content name stored in a father node of the $M^{th}$-level node when determining that the first content name stored in each $M^{th}$-level node in the content name tree is corresponding to a first network node, where each $M^{th}$-level node is connected to a same father node, the first network node includes at least one content router. Thus, compression of a content name in a content name database is achieved, and space occupied by the content name is saved.

DESCRIPTION OF EMBODIMENTS

In order to make objectives, technical solutions, and advantages of embodiments of the present invention clearly, technical solutions in the embodiments of the present invention will be described hereunder clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

Figure 1:
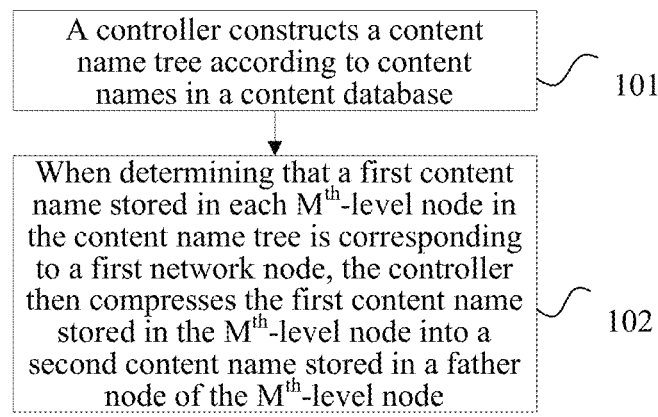
FIG. 1 is a flow chart of a method for compressing a content name according to an embodiment of the present invention.

FIG. 1 is a flow chart of a method for compressing a content name according to an embodiment of the present invention. As shown in FIG. 1, the method for compressing a content name includes:

Step 101, a controller constructs a content name tree according to content names in a content database.

Specifically, the content name tree is tree-structured, a first-level node of the content name tree stores a first-level prefix of a content name, an $N^{th}$-level node of the content name tree stores prefixes of at least first N levels of the content name, and N is an integer greater than 1. The content database in this embodiment is stored in the controller.

This embodiment is applicable to a network formed by several content routers and a controller, and specifically, the controller is physically connected to a content router, meanwhile, the content routers are physically connected to adjacent content routers, that is to say, the controller may not be physically and directly connected to a content router in the network, and the controller may also interact with the content router by means of sending an instruction, where physical connection may be a point-to-point adjacency relation established through a link layer and the physical connection.

In the controller, besides a function of a conventional software defined network (Software Defined Network, SDN for short) controller, a content database and a topology information table may also be included, where the content database may stores a content name and information about a content router corresponding to the content name, such as a content router identification, and the topology information table may store a topology structure of a content router and an adjacent content router, i.e. a content router identification, an adjacent content router identification and a port, where the port is a port used for data transmission between the content router and the adjacent content router. For instance, the topology information table may include R1, R2 and port No. 1, the content router R1 may perform data transmission with the content router R2 via the port No. 1.

Figure 2:
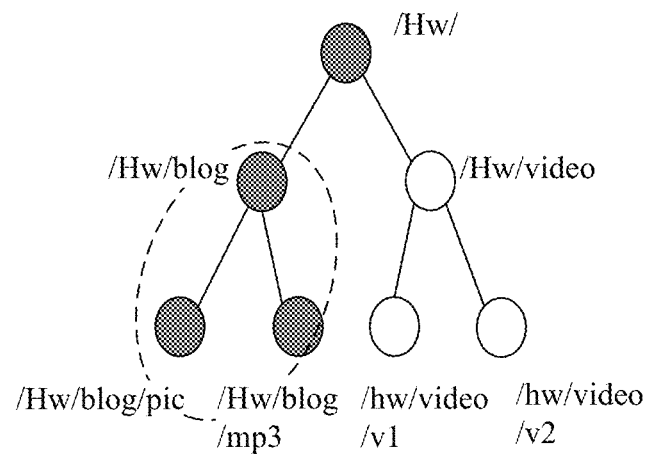
FIG. 2 is a schematic structural diagram of a content name tree in an embodiment of a method for compressing a content name according to the present invention.
Figure 3:
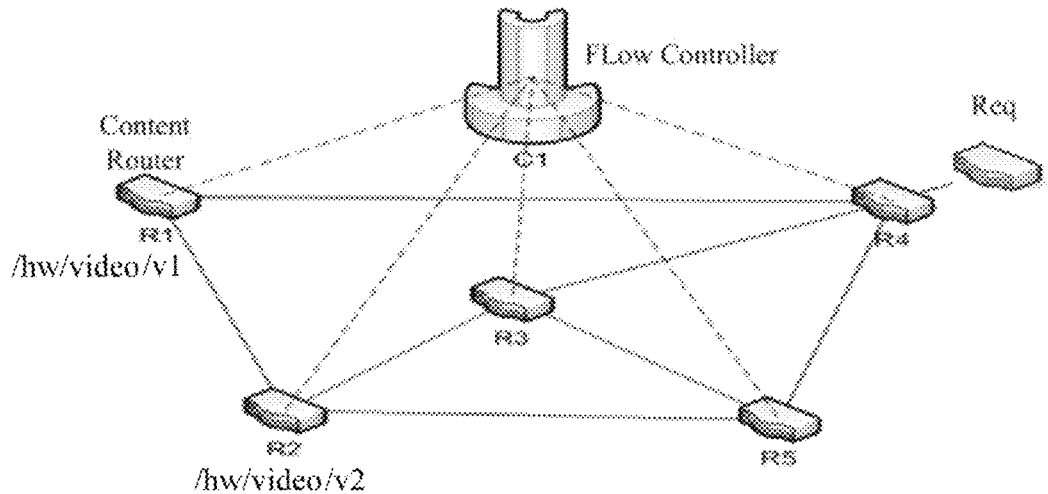
FIG. 3 is a schematic diagram of a topology structure in an embodiment of a method for compressing a content name according to the present invention.

FIG. 2 is a schematic structural diagram of a content name tree in an embodiment of a method for compressing a content name according to the present invention, and FIG. 3 is a schematic diagram of a topology structure in an embodiment of a method for compressing a content name according to the present invention. The content name tree may be constructed according to the content database, for instance, a first-level node of the content name tree stores a first-level prefix hw of a content name, and the content name tree has two second-level nodes, where a second-level node on the left stores prefixes hw/blog of first two levels of a content name, two third-level nodes connected to the second-level node respectively store prefixes of first three levels of a content name, for instance, a third-level node on the left stores a content name hw/blog/pic, a third-level node on the right stores a content name hw/blog/mp3; meanwhile, a second-level node on the right stores prefixes hw/video of first two levels of a content name, two third-level nodes connected to the second-level node respectively stores prefixes of first three levels of a content name, for instance, a third-level node on the left stores a content name hw/video/v1, and a third-level node on the right stores a content name hw/video/v2. It should be noted that, an $N^{th}$-level node of the content name tree may also stores prefixes of first P levels of a content name, where P is greater than N.

Step 102, when determining that a first content name stored in each $M^{th}$-level node in the content name tree is corresponding to a first network node, the controller then compresses the first content name stored in the $M^{th}$-level node into a second content name stored in a father node of the $M^{th}$-level node.

In this embodiment, the first network node includes at least one content router, each $M^{th}$-level node is connected to a same father node, M is an integer greater than 1, and M is less than or equal to N.

For instance, as shown in FIG. 2, according to information in the topology information table of the controller, if content names stored in all leaf nodes connected to a second-level node are corresponding to a first network node in the topology information table, i.e. the content router R2, then content names stored in third-level nodes, i.e. /hw/blog/pic, /hw/blog/mp3, may be compressed into a first content name, i.e. /hw/blog, stored in a father node of the third-level nodes, i.e. the second-level node.

In this embodiment, a controller constructs a content name tree according to content names in a content database, where a first-level node of the content name tree stores a first-level prefix of a content name in the content database, and an $N^{th}$-level node of the content name tree stores prefixes of first N levels of the content name; then, when determining that the first content name stored in each $M^{th}$-level node in the content name tree is corresponding to a first network node, the controller compresses a first content name stored in the $M^{th}$-level node into a second content name stored in a father node of the $M^{th}$-level node where each $M^{th}$-level node is connected to the same father node, and the first network node includes at least one content router. Thus, compression of a content name in a content name database is achieved, and space occupied by the content name is saved.

Figure 4:
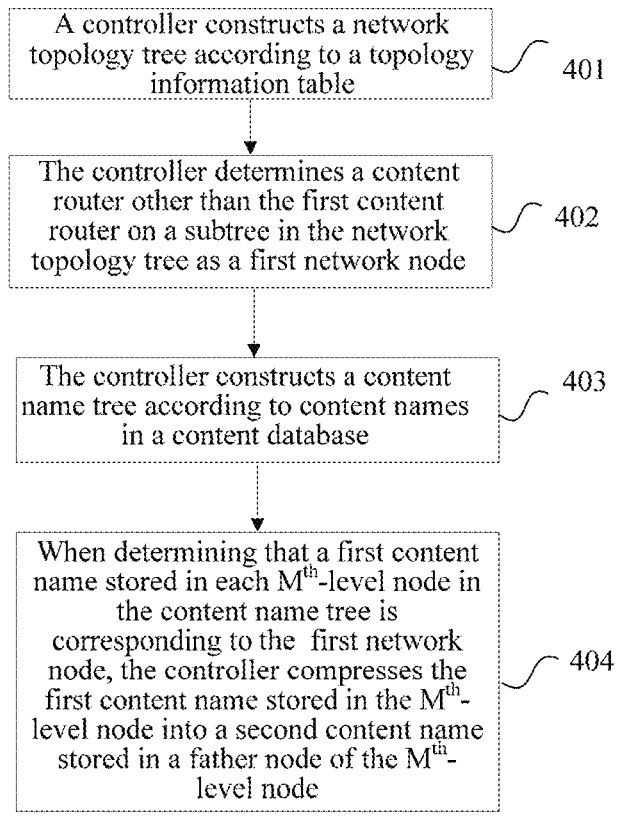
FIG. 4 is a flow chart of a method for compressing a content name according to another embodiment of the present invention.
Figure 5:
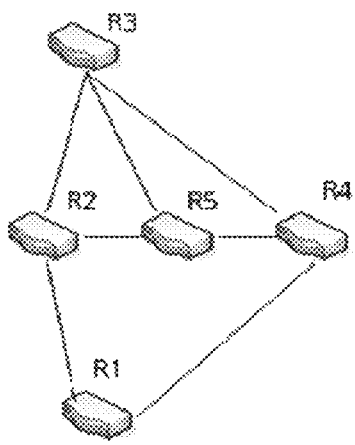
FIG. 5 is a schematic diagram of a network topology tree in an embodiment of a method for compressing a content name according to the present invention.

FIG. 4 is a flow chart of a method for compressing a content name according to another embodiment of the present invention, and FIG. 5 is a schematic diagram of a network topology tree in an embodiment of a method for compressing a content name according to the present invention; as shown in FIG. 4, the method for compressing the content name may include:

Step 401, a controller constructs a network topology tree according to a topology information table.

Specifically, the network topology tree is tree-structured, a first content router is set at a first-layer node of the network topology tree, an $N^{th}$ content router directly and physically connected to an $M^{th}$ content router is set at an $N^{th}$-layer node of the network topology tree, the topology information table is stored in the controller, and a topology structure between content routers is stored in the topology information, where N is an integer greater than 1, and M+1=N.

For instance, as shown in FIG. 5 and FIG. 3, the controller may construct a network topology tree as shown in FIG. 5 according to a topology information table. For instance, a content router R3 is set at a first-layer node of the network topology tree, and second content routers directly and physically connected to the content router R3 are set at second-layer nodes of the network topology tree, where the second content routers includes R2, R5 and R4, and it should be noted that there may be one or more second content routers.

And then, a third content router directly and physically connected to the content router R2 is set at a third-layer node of the network topology tree, where there may be one or more third content routers, and the third content router as shown in FIG. 5 is R1.

Optionally, a transversal non-optimal path may be deleted, that is, topology connections among all $N^{th}$-layer nodes are deleted. For instance, delete topology connections among all second-layer nodes, that is, delete topology connections among the content routers R2, R5 and R4.

Step 402, the controller determines a content router other than the first content router on a subtree in the network topology tree as a first network node.

In this embodiment, the first content router is connected to the first network node via a first port of the first content router, where the first network node includes at least one content router.

Specifically, as shown in FIG. 5, the controller may determine the content router R2 and the content router R1 on a subtree in the network topology tree as the first network node in the network.

Step 403, the controller constructs a content name tree according to content names in a content database.

A principle of Step 403 in this embodiment is basically similar to that of Step 101 in the above embodiment, which will not be repeated herein.

Step 404, when determining that a first content name stored in each $M^{th}$-level node in the content name tree is corresponding to the first network node, the controller compresses the first content name stored in the $M^{th}$-level node into a second content name stored in a father node of the $M^{th}$-level node.

In this embodiment, the first network node includes at least one content router.

It should be noted that, each $M^{th}$-level node is connected to the same father node, M is an integer greater than or equal to 1, and M is less than or equal to N.

For instance, as shown in FIG. 2, content names hw/video/v1 and hw/video/v2 are respectively stored in two third-level nodes connected to a second-level node on the right, and then, according to the topology structure as shown in FIG. 3, the content name hw/video/v1 is stored in R1, while the content name hw/video/v2 is stored in R2, and the content routers R1 and R2 are the first network node in the network, then the first content name stored in the third-level nodes may be compressed into a second content name, i.e. hw/video, stored in the father node connected to the third-level nodes, that is, the second-level node.

In this embodiment, a controller constructs a network topology tree according to a topology information table, and then determines a content router other than a first content router on a subtree in the network topology tree as a first network node, and when determining that the content name stored in each $M^{th}$-level node in a content name tree is corresponding to the first network node, compresses the first content name stored in the $M^{th}$-level node into a second content name stored in a father node of the $M^{th}$-level node. Thus, compression of a content name in a content name database is achieved, and space occupied by the content name is saved.

Based on the above embodiments, in an event-triggering scenario, that is, when a content router in the network requests the controller to search a route of the first content name, a specific implementation may be:

Before Step 101 or Step 401, or after Step 101 or Step 401, may also include:

The controller receives a route request message sent by a second content router.

Specifically, the route request message is used to request a route from the second content router to a content router storing the first content name, from the controller, where the route request message carries the first content name.

Or, after Step 102 or Step 402, may also include:

The controller receives a route request message sent by a second content router.

Specifically, after the first content name stored in the $M^{th}$-level node is compressed into the second content name stored in the father node of the $M^{th}$-level node, the controller may receive a route request message sent by the second content router, where the route request message is used to request the second content router to obtain a route of the first content name, and the route request message carries the first content name.

Based on the above embodiments, after Step 102 or Step 403, and after the controller receives the route request message sent by the second content router, may also include:

The controller sends a route response message to the second content router and all content routers located on the route from the second content router to the content router storing the first content name.

Specifically, the route response message carries the second content name and the route from the second content router to the content router storing the first content name, and the second content name is a content name obtained by compressing the first content name, where the route is a route for the second content router to obtain the first content name, and there is at least one content router on the route.

For instance, the controller receives a route request message sent by the second content router in the network, such as R4, where the route request message is used to request a route storing the content name, such as/hw/blog/pic, and the route request message carries the content name/hw/blog/pic. After the controller searches the topology information table, an optimal route is obtained via calculations: R4-R3-R2, thus, the controller sends a route response message to a content router on the route, i.e. the third content router, where the route response message carries the routing information, and the routing information includes a compressed content name and a port of the third content router forwarding the route information. It should be noted that, the third content router may be one content router, and may also be a plurality of content routers, and thus, if there are a plurality of content routers, then the port included in the routing information is a port corresponding to the content router.

Optionally, based on the above embodiments, in a scenario of periodically maintaining an FIB, after Step 101 or Step 403, that is, after the controller constructs the content name tree according to the content names in the content database, may also include:

The controller constructs a first forwarding table FIB according to the first network node and the second content name.

Specifically, the first FIB carries the second content name and the first port, and the first port is a port through which the first content router reaches the first network node.

It should be noted that, the network topology tree in this embodiment at least has one subtree, and each subtree is corresponding to a second content name, and thus the first FIB includes at least one FIB entry.

Furthermore, the controller may send the first FIB to the first content router.

In this embodiment, there are at least two implementations for the controller to periodically send the first FIB to the first content router, which are specifically:

A first implementation: the controller may send an FIB request to the first content router, where the FIB request carries the first FIB, the first content router subsequently updates the FIB as the first FIB, and the controller then receives an FIB response sent by the first content router, where the FIB response carries information indicating a successful reception, and if the first content router does not update the FIB as the first FIB, then the FIB response carries information indicating an unsuccessful reception.

A second implementation: the controller may firstly send a digest request message to the first content router, and after the first content router receives the digest request message, the first content router determines that the digest request message is authentic, and is information indicating a need of update, and then the first content router sends an FIB request message to the controller, that is, the controller receives the FIB request message sent by the first content router, which is used to request the first FIB;

Subsequently, the controller may send an FIB response message to the first content router, where the FIB response message carries the first FIB.

It should be noted that, the FIB request message and the FIB response message may use a content centric networking (Content Centric Networking, CCN for short hereafter), and the request and the response may also be made via other data packets including a content name, and all schemes to implement transmission of the FIB by carrying a content name or address information in a data packet may be applied in this embodiment.

Furthermore, based on the above embodiments, after the route corresponding to the compressed content name is sent to the corresponding content router, that is, after Step 102 or Step 403, the controller may receive content information sent by a third content router, and store a new content name carried in the content information into the content name tree, where a first-level node of the content name tree stores a first-level prefix of the new content name, an $N^{th}$-level node of the content name tree stores prefixes of at least first N levels of the new content name, where N is an integer greater than 1, and the content information carries the new content name and a content router identification storing the new content name, and subsequently, the controller determines whether the new content name stored in a $K^{th}$-level node and the second content name stored in a further $K^{th}$-level node are respectively stored in different network nodes, where the further $K^{th}$-level node and the $K^{th}$-level node storing the new content name have a same father node, the new content name is stored in a second network node, the second network node is a content router, the first content name is stored in the first network node, and K is less than or equal to N.

Specifically, if the controller determines that a new content name stored in a $K^{th}$-level node and the content name stored in the further $K^{th}$-level node are respectively stored in a same network node, and the further $K^{th}$-level node and the $K^{th}$-level node storing the new content name have the same father node, that is, the father node of the new content name in the content name tree and the content name stored in the child node that is previously connected to the father node are corresponding to a same position in the network topology tree, then the newly-added content name does not have an influence upon routing table information that has been issued, and there is no need to update the issued routing table/route entry.

Specifically, if the controller determines that the new content name stored in the $K^{th}$-level node and the content name stored in a further $K^{th}$-level node that is under the father node of the $K^{th}$-level node are respectively stored in different network nodes, then the controller updates routing information on a third network node connected to both the first network node and the second network node, that is, issuing an updated route entry to the third network node. It should be noted that the third network node is a content router or a set of a plurality of content routers, the third network node may be directly connected to the first network node and the second network node with an interval of one hop, and may also be connected to the first network node and the second network node via other network nodes with an interval of two or more hops.

Specifically, there are at least two implementations for issuing the updated route entry to the third network node:

A first implementation: the controller sends an insertion message to the third network node, where the insertion message carries the new content name stored in the content name tree, and a second port between the third network node and the second network node, for instance, issue updated route entries {/hw/blog/text, 2}, {/hw/blog/text, 3} to the R3 and R4 respectively. In a longest match approach, influence will not be generated between newly-issued routing information and original routing information.

A second implementation: sending update information to the third network node, which is used to update the routing information previously stored in the third network node, for instance, the original route entry {/hw/blog,1} may be replaced with new route entries {/hw/blog/pic,1}, {/hw/blog/mp3, 1}, {/hw/blog/text,2}.

For instance, the controller may use an ICN protocol to issue updated routing information to the third network node, where a reserved prefix in the request packet may be CTRL/UPDATE/Router ID. Correspondingly, after receiving the route entry, the third network node firstly performs a match search, and updates a route that is successfully matched, and performs an insertion for the non-existed. Subsequently, the third network node sends a data Data Packet to the controller, where the data packet carries "information indicating a successful or unsuccessful update".

Figure 6:
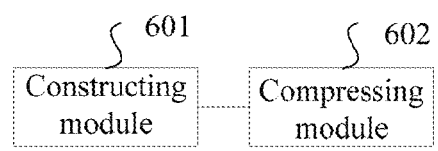
FIG. 6 is a schematic structural diagram of an apparatus for compressing a content name according to an embodiment of the present invention.
Figure 7:
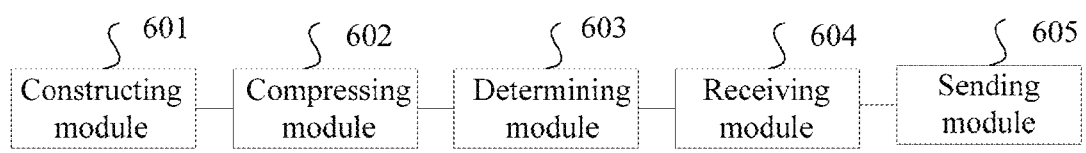
FIG. 7 is a schematic structural diagram of an apparatus for compressing a content name according to another embodiment of the present invention.

FIG. 6 is a schematic structural diagram of an apparatus for compressing a content name according to an embodiment of the present invention. As shown in FIG. 6, the apparatus for compressing the content name includes: a constructing module 601 and a compressing module 602.

The constructing module 601 is configured to construct a content name tree according to content names in a content database, where the content database is stored in a controller, the content name tree is tree-structured, a first-level node of the content name tree stores a first-level prefix of a content name in the content database, an $N^{th}$-level node of the content name tree stores prefixes of at least first N levels of the content name, and N is an integer greater than 1.

The compressing module 602 is configured to, when determining that a first content name stored in each $M^{th}$-level node in the content name tree is corresponding to a first network node, compress the first content name stored in the $M^{th}$-level node into a second content name stored in a father node of the $M^{th}$-level node, where each $M^{th}$-level node is connected to a same father node, the first network node includes at least one content router, M is an integer greater than or equal to 1, and M is less than or equal to N.

In this embodiment, a controller constructs a content name tree according to content names in a content database, where a first-level node of the content name tree stores a first-level prefix of a content name in the content database, and an $N^{th}$-level node of the content name tree stores prefixes of first N levels of the content name; subsequently, the controller compresses a first content name stored in the $M^{th}$-level node into a second content name stored in a father node of the $M^{th}$-level node when determining that the first content name stored in each $M^{th}$-level node in the content name tree is corresponding to a first network node in a network. Thus, compression of a content name in a content name database is achieved, and space occupied by the content name is saved.

Based on the above embodiments, the apparatus may further include: a determining module 603.

The constructing module 601 is further configured to construct a network topology tree according to a topology information table, where the network topology tree has a tree structure, a first content router is set at a first-layer node of the network topology tree, an $N^{th}$ content router directly and physically connected to an $M^{th}$ content router is set at an $N^{th}$-layer node of the network topology tree, M+1=N, N is an integer greater than 1, the topology information table is stored in the controller, and a topology structure between content routers is stored in the topology information table.

The determining module 603 is configured to determine a content router other than the first content router on a subtree in the network topology tree as the first network node, where the first network node is connected to the first content router via a first port of the first content router.

Based on the above embodiments, the apparatus may further include: a receiving module 604, configured to receive a route request message sent by a second content router, where the route request message is used to request, from the controller, a route from the second content router to a content router storing the first content name, and the route request message carries the first content name.

Based on the above embodiment, the apparatus may further include: a sending module 605, configured to send a route response message to the second content router and all content router located on the route from the second content router to the content router storing the first content name, where the route response message carries the second content name and the route from the second content router to the content router storing the first content name, and the second content name is a content name obtained by compressing the first content name.

Based on the above embodiments, the constructing module 601 is further configured to construct a first forwarding table FIB according to the first network node and the second content name, where the first FIB carries the second content name and the first port, and the first port is a port through which the first content router reaches the first network node.

Furthermore, based on the above embodiments, the sending module 605 is further configured to send the first FIB to the first content router.

Optionally, based on the above embodiment, the receiving module 604 is further configured to receive an FIB request message sent by the first content router, where the FIB request message is used to request the first FIB.

The sending module 605 is further configured to send an FIB response message to the first content router, where the FIB response message carries the first FIB.

Furthermore, based on the above embodiments, the receiving module 604 is further configured to receive content information sent by a third content router, and store a new content name carried in the content information into the content name tree, where a first-level node of the content name tree stores a first-level prefix of the new content name, an $N^{th}$-level node of the content name tree stores prefixes of at least first N levels of the new content name, and the content information carries the new content name and a content router identification storing the new content name.

The determining module 603 is further configured to determine whether the new content name stored in a $K^{th}$-level node and the second content name stored in a further $K^{th}$-level node are respectively stored in different network nodes, where the further $K^{th}$-level node and the $K^{th}$-level node storing the new content name have a same father node, the new content name is stored in a second network node, the second network node is a content router, and the first content name is stored in the first network node; if so, then the controller updates routing information on a third network node connected to both the first network node and the second network node, where the third network node includes at least one content router.

Furthermore, based on the above embodiments, the sending module 605 is specifically configured to send the new content name stored in the $N^{th}$-level node and a second port to the third network node, where the second port is a port through which the third network node reaches the second network node.

In this embodiment, compression of a content name in a content name database is achieved via the above implementations, and space occupied by the content name is saved.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for compressing a content name, comprising:
    constructing, by a controller, a content name tree according to content names in a content database, wherein the content name tree is tree-structured, a first-level node of the content name tree stores a first-level prefix of a content name, an $N^{th}$-level node of the content name tree stores prefixes of at least first N levels of the content name, and N is an integer greater than 1; and
    when determining, by the controller, that a first content name stored in each $M^{th}$-level node in the content name tree is corresponding to a first network node, compressing the first content name stored in the $M^{th}$-level node into a second content name stored in a father node of the $M^{th}$-level node, wherein each $M^{th}$-level node is connected to a same father node, the first network node comprises at least one content router, M is an integer greater than 1, and M is less than or equal to N.

2. The method according to claim 1, wherein, before the constructing, by the controller, the content name tree according to the content names in the content database, further comprising:
    constructing, by the controller, a network topology tree according to a topology information table, wherein the network topology tree is tree-structured, a first content router is set at a first-layer node of the network topology tree, an $N^{th}$ content router directly and physically connected to an $M^{th}$ content router is set at an $N^{th}$-layer node of the network topology tree, M+1=N, N is an integer greater than 1, the topology information table is stored in the controller, and a topology structure between content routers is stored in the topology information table; and
    before the compressing the first content name stored in the $M^{th}$-level node into the second content name stored in the father node of the $M^{th}$-level node, further comprising:
    determining, by the controller, a content router other than the first content router on a subtree in the network topology tree as the first network node, wherein the first network node is connected to the first content router via a first port of the first content router.

3. The method according to claim 2, wherein, before the constructing, by the controller, the content name tree according to the content names in the content database, or after the constructing, by the controller, the content name tree according to the content names in the content database, further comprising:
    receiving, by the controller, a route request message sent by the second content router, wherein the route request message is used to request, from the controller, a route from the second content router to a content router storing the first content name, and the route request message carries the first content name.

4. The method according to claim 3, wherein, after the receiving, by the controller, the route request message sent by the second content router, further comprising:
    sending, by the controller, a route response message to the second content router and all content router located on the route from the second content router to the content router storing the first content name, wherein the route response message carries the second content name and the route from the second content router to the content router storing the first content name, and the second content name is a content name obtained by compressing the first content name.

5. The method according to claim 2, wherein, after the compressing the first content name stored in the $M^{th}$-level node into the second content name stored in the father node of the $M^{th}$-level node, further comprising:
    constructing, by the controller, a first forwarding table (FIB) according to the first network node and the second content name, wherein the first FIB carries the second content name and the first port, and the first port is a port through which the first content router reaches the first network node.

6. The method according to claim 5, wherein, after the constructing, by the controller, the first forwarding table (FIB) according to the first network node and the second content name, further comprising:
    sending, by the controller, the first FIB to the first content router.

7. The method according to claim 5, wherein, after the constructing, by the controller, the first forwarding table FIB according to the first network node and the second content name, further comprising:
  receiving, by the controller, an FIB request message sent by the first content router, wherein the FIB request message is used to request the first FIB; and
  sending, by the controller, an FIB response message to the first content router, wherein the FIB response message carries the first FIB.

8. The method according to claim 1, wherein, after the compressing the first content name stored in the $M^{th}$-level node into the second content name stored in the father node of the $M^{th}$'-level node, further comprising:
  receiving, by the controller, content information sent by a third content router, and storing a new content name carried in the content information into the content name tree, wherein a first-level node of the content name tree stores a first-level prefix of the new content name, an $N^{th}$-level node of the content name tree stores prefixes of at least first N levels of the new content name, and the content information carries the new content name and a content router identification storing the new content name;
  determining, by the controller, whether the new content name stored in a $K^{th}$-level node and the second content name stored in a further $K^{th}$-level node are respectively stored in different network nodes, wherein the further $K^{th}$'-level node and the $K^{th}$-level node stored with the new content name have a same father node, the new content name is stored in a second network node, the second network node is a content router, the first content name is stored in the first network node, and K is less than or equal to N; and
  when it is determined that the new content name and the second content name are respectively stored in different network nodes, updating, by the controller, routing information on a third network node connected to both the first network node and the second network node, wherein the third network node comprises at least one content router.

9. The method according to claim 8, wherein, the updating, by the controller, the routing information on the third network node connected to both the first network node and the second network node comprises:
  sending, by the controller, the new content name and a second port to the third network node, wherein the second port is a port through which the third network node reaches the second network node.

10. An apparatus for compressing a content name, comprising:
  a processor; and
  a non-transitory computer readable medium including computer executable instructions that, when executed by the processor cause the processor to perform a method comprising:
  constructing a content name tree according to content names in a content database, wherein the content name tree is tree-structured, a first-level node of the content name tree stores a first-level prefix of a content name, an $N^{th}$-level node of the content name tree stores prefixes of at least first N levels of the content name, and N is an integer greater than 1; and
  when determining that a first content name stored in each $M^{th}$-level node in the content name tree is corresponding to a first network node, compressig the first content name stored in the $M^{th}$-level node into a second content name stored in a father node of the $M^{th}$-level node, wherein each $M^{th}$-level node is connected to a same father node, the first network node comprises at least one content router, M is an integer greater than or equal to 1, and M is less than or equal to N.

11. The apparatus according to claim 10, wherein the non-transitory computer readable medium further includes computer executable instructions for:
  constructing a network topology tree according to a topology information table, wherein the network topology tree is tree-structured, a first content router is set at a first-layer node of the network topology tree, an $N^{th}$ content router directly and physically connected to an $M^{th}$ content router is set at an $N^{th}$-layer node of the network topology tree, M+1=N, N is an integer greater than 1, and a topology structure between content routers is stored in the topology information table; and
  determining a content router other than the first content router on a subtree in the network topology tree as the first network node, wherein the first network node is connected to the first content router via a first port of the first content router.

12. The apparatus according to claim 11, wherein the non-transitory computer readable medium further includes computer executable instructions for: receiving a route request message sent by a second content router, wherein the route request message is used to request a route from the second content router to a content router storing the first content name, and the route request message carries the first content name.

13. The apparatus according to claim 12, wherein the non-transitory computer readable medium further includes computer executable instructions for: sending a route response message to the second content router and all content router located on the route from the second content router to the content router storing the first content name, wherein the route response message carries the second content name and the route from the second content router to the content router storing the first content name, and the second content name is a content name obtained by compressing the first content name.

14. The apparatus according to claim 10, wherein the non-transitory computer readable medium further includes computer executable instructions for: constructing a first forwarding table (FIB) according to the first network node and the second content name, wherein the first FIB carries the second content name and the first port, and the first port is a port through which the first content router reaches the first network node.

15. The apparatus according to claim 14, wherein the non-transitory computer readable medium further includes computer executable instructions for: sending the first FIB to the first content router.

16. The apparatus according to claim 14, wherein the non-transitory computer readable medium further includes computer executable instructions for: receiving an FIB request message sent by the first content router, wherein the FIB request message is used to request the first FIB; and
  sending an FIB response message to the first content router, wherein the FIB response message carries the first FIB.

17. The apparatus according to claim 10, wherein the non-transitory computer readable medium further includes computer executable instructions for: receiving content information sent by a third content router, and storing a new content name carried in the content information into the content name tree, wherein a first-level node of the content name tree stores a first-level prefix of the new content name, an $N^{th}$-level node of the content name tree stores prefixes of at least first N levels of the new content name, and the content information carries the new content name and a content router identification storing the new content name;

determining whether the new content name stored in a $K^{th}$-level node and the second content name stored in a further $K^{ill}$-level node are respectively stored in different network nodes, wherein the further $K^{th}$-level node and the $K^{th}$-level node storing the new content name have a same father node, the new content name is stored in a second network node, the second network node is a content router, the first content name is stored in the first network node, and K is less than or equal to N; and when it is determined that the new content name and the second content name are respectively stored in different network nodes, updating routing information on a third network node connected to both the first network node and the second network node, wherein the third network node comprises at least one content router.

18. The apparatus according to claim 17, wherein the non-transitory computer readable medium further includes computer executable instructions for: sending the new content name and a second port to the third network node, wherein the second port is a port through which the third network node reaches the second network node.

* * * * *

UNITED STATES PATENT AND TRADEMARK OFFICE
CERTIFICATE OF CORRECTION

PATENT NO. : 9,628,368 B2  Page 1 of 1
APPLICATION NO. : 15/005717
DATED : April 18, 2017
INVENTOR(S) : Yao et al.

It is certified that error appears in the above-identified patent and that said Letters Patent is hereby corrected as shown below:

In the Claims

Column 15, Line 14, "$M^{th}$ '" should read -- $M^{th}$ --.

Column 15, Line 29, "$K^{th}$'" should read -- $K^{th}$ --.

Column 15, Line 66, "compressig" should read -- compressing --.

Column 17, Line 8, "$K^{ilb}$" should read -- $K^{th}$ --.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*